United States Patent [19]

Iyeta

[11] 4,083,565
[45] Apr. 11, 1978

[54] DEVICE FOR CORRECTING OFFSET ANGLE OF PICKUP ARM IN TRACKING PICKUP APPARATUS

[75] Inventor: Motoi Iyeta, Hamakita, Japan

[73] Assignee: Nippon Gakki Seizo Kabushiki Kaisha, Hamamatsu, Japan

[21] Appl. No.: 733,850

[22] Filed: Oct. 19, 1976

[30] Foreign Application Priority Data

Oct. 23, 1975 Japan .................. 50-144792[U]

[51] Int. Cl.² .............................................. G11B 3/10
[52] U.S. Cl. ................................... 274/23 A; 250/230
[58] Field of Search .................. 274/23, 15 R, 13 R; 250/211 K, 230

[56] References Cited

U.S. PATENT DOCUMENTS

| 3,222,531 | 12/1965 | Morrison | 250/211 K |
| 3,272,513 | 9/1966 | Jeles | 274/23 A |
| 3,321,766 | 5/1967 | Everest | 250/230 |
| 3,572,724 | 3/1971 | Rabinow | 274/23 A |

FOREIGN PATENT DOCUMENTS

| 1,361,610 | 7/1974 | United Kingdom | 274/23 A |

Primary Examiner—Richard E. Aegerter
Assistant Examiner—John W. Shepperd
Attorney, Agent, or Firm—Cushman, Darby & Cushman

[57] ABSTRACT

In a linear tracking pickup apparatus of a record player, a video disc player and the like wherein a pickup arm is swingably and pivotally supported on a gimbal support mechanism, a device for detecting an offset angle of the pickup arm comprising: a light-reflecting surface formed on a portion of a first frame as a part of the surface of this portion, which first frame being a portion of the gimbal support mechanism and swingable with the horizontal swing of the pickup arm; a light-emitting source fixed to a second frame, not swingable but only linearly movable, of the gimbal support mechanism so as to face the light-reflecting surface; and a photo-sensitive element fixed to the second frame for receiving the light rays reflected by the light-reflecting surface. This arrangement is free of any such eccentric load otherwise placed additionally on the pickup arm via its support mechanism on which a detector is to be mounted in the conventional art, and a desirable lateral balance of the pickup arm is maintained throughout the reproduction.

5 Claims, 10 Drawing Figures

DEVICE FOR CORRECTING OFFSET ANGLE OF PICKUP ARM IN TRACKING PICKUP APPARATUS

BACKGROUND OF THE INVENTION a. Field of the Invention

The present invention relates to a device for detecting an offset angle (tracking angle) of a pickup arm in a record player, a video disc player or the like. More particularly, it pertains to a device for detecting an offset angle of a pickup arm which does not carry on the arm support mechanism any such additional heavy detecting means as will cause a loss of the lateral balance of the pickup arm.

b. Brief Description of the Prior Art

The signal-carrying groove of a phonographic disc is engraved or cut by a cutter which moves constantly linearly in a radial direction of the plane of the disc above thereof which is to be cut. In case the disc which carries a signal groove is played on for example a record player employing a conventional swingable and pivotable pickup arm, the reproduction of the recorded signal is conducted by a stylus-carrying cartridge which is mounted at the foremost end of the pickup arm of a certain length which moves forming a circular arcuate loci relative to a fulcrum of the pickup arm swingably and pivotally supported on a support mechanism. Therefore, in case the stylus which is carried on the foremost end of the pickup arm is set initially at the start of play so that its facing direction is held exactly keeping a tangential line relative to the beginning portion of the groove of the phonographic disc, it will be understood that as the tip of the stylus travels farther forward toward the center of the disc, the direction of facing of the stylus will change progressively and accordingly there will progressively arise a tracking error of the stylus. Conversely, in the similar manner, in case the stylus carried on the foremost end of the pickup arm is set so as to produce no tracking error (offset angle) $\Delta\phi$ when it is positioned at the innermost groove close to the center of the grooved disc, a tracking error will develop most intensively at the starting part of the groove engaged by the tip of the stylus, gradually lessening the magnitude of this tracking error as it travels progressively toward the center of the disc. As such, a second higher harmonic distortion will arise in each of the above-mentioned cases, resulting in a loss of fidelity in the reproduction of the original signal to be recorded.

In order to minimize the development of such tracking errors, there has been used in the past a pickup arm which is bent, when manufactured, to have an offset angle $\Delta\phi$ at an appropriate portion of its whole length. With such an off-set pickup arm, the problem of development of the horizontal tracking angle deflection is solved to a certain extent. However, there will be exerted on the pickup arm a force which tends to urge the pickup arm to swing clockwise relative to its fulcrum. Such a force may be called an inside force. This force will act so as to push the reproduction stylus toward the inside of the walls constituting a signal groove of the disc as this disc is being played, or it will act as a force to destroy the lateral balance of the running pickup arm. Thus, such a force imparts the pickup arm an adverse effect on the ability of this pickup arm to trace the signal groove.

The occurrence of the above-said inside force may be reduced to some extent by the additional provision of an inside force cancelling means on the pickup arm supporting mechanism. Also, the development of the aforesaid lateral imbalance of the pickup arm may be diminished to some extent by the additional provision of a lateral balance keeping means on the pickup arm support. Nevertheless, these prior attempts have the drawbacks such that only one side of the walls of the signal groove of the phonographic disc tends to wear quicker than does the other side of the walls, or only one side of the reproduction stylus tends to wear as a disc is played frequently on the conventional record player.

In order to eliminate the foregoing drawbacks of the prior art, there has been proposed a linear tracking pickup arm system or the tracking error-less pickup arm system which is designed so that the pickup arm slides linearly radially toward the center of the phonographic disc during play while keeping a tangential line relative to the signal groove of the phonographic disc.

With this known linear tracking pickup arm system, however, it is practically impossible to always keep the pickup arm tangential to the circumference of the phonographic groove of the disc on account of a deviation or vibrations which the pickup arm undergoes at the time of reproduction, due to the errors in mechanical movement transmitting mechanism of the system which are introduced at the time of manufacture. In order to eliminate such deviation of the tracking angle which takes place due to the failure of keeping the pickup arm tangential relative to the signal groove of the disc, it has been proposed to employ additionally a tracking angle detecting and compensating means such as a light-to-electricity (photo-electric) transducer to detect the tracking angle of the pickup arm, and also a servo motor connected to the pickup arm driving means so that, upon a deviation of the pickup arm is detected, a voltage which is proportional to the detected lateral deviation of the pickup arm is applied to this servo motor to move the pickup arm in the compensating direction and distance so as to automatically render the deviation output or the tracking error of the pickup arm zero.

As the tracking angle detecting and compensating means of the prior art, there has been employed an arrangement such that a shutter plate having a narrow slit formed therethrough is provided on the pickup arm supporting mechanism which is assigned to cause horizontal swinging movement of the pickup arm, so that any variation of the amount of light rays which are allowed to pass through this slit is detected so that, accordingly, the trifle change representing a horizontal deviation of the pickup arm is detected. The tracking error detecting means of the prior art invariably is arranged so that the aforesaid slit-carrying shutter plate is additionally attached to the horizontal swingable shaft of the pickup arm supporting mechanism such as a gimbal support mechanism in such a manner that this attachment of the shutter plate unavoidably serves to add a certain amount of eccentric load on said shaft of the pickup arm supporting mechanism. Thus, the known technique results in a major cause for a loss of lateral balance of the pickup arm due to the weight of such an accessary. Besides, the known tracking error detecting and compensating technique requires a complicated arrangement. As such, its manufacturing cost increases undesirably.

SUMMARY OF THE INVENTION

It is, therefore, a general object of the present invention to provide a pickup arm driving device for a tracking pickup arm apparatus, which greatly improves the drawbacks of the prior art described above.

A main object of the present invention is to provide a device for detecting and compensating an offset angle of the pickup arm of the type described, which does not develop a loss of the lateral balance of this pickup arm during the travel of this pickup arm, and accordingly will not develop any undesirable mechanical resonance.

Another object of the present invention is to provide a device for correcting a tracking angle of the pickup arm as described above, which is simple in structure.

Still another object of the present invention is to provide a device for correcting a tracking angle of the pickup arm as described above, which minimizes possible malfunctions caused by external light rays.

In accordance with the principle of the present invention, there is provided a device for correcting an offset angle of the pickup arm in a tracking pickup apparatus, the improvement lying in the arrangement that a part of the surface of a first or the inner frame of a gimbal support mechanism of the pickup arm is made as a reflecting surface, that the light rays which are emitted in a spot-like beam from a light-emitting source provided in a fixed fashion so as to correspond to said reflecting surface is reflected by said reflecting surface so that this reflected light rays are received by a light-receptor provided at a fixed position, to thereby detect any offset angle of the pickup arm in accordance with a change in the position of the most intensive portion in the spot of reflected light rays.

DETAILED DESCRIPTION OF THE PREFERRED EMBODIMENT

Figure 1:
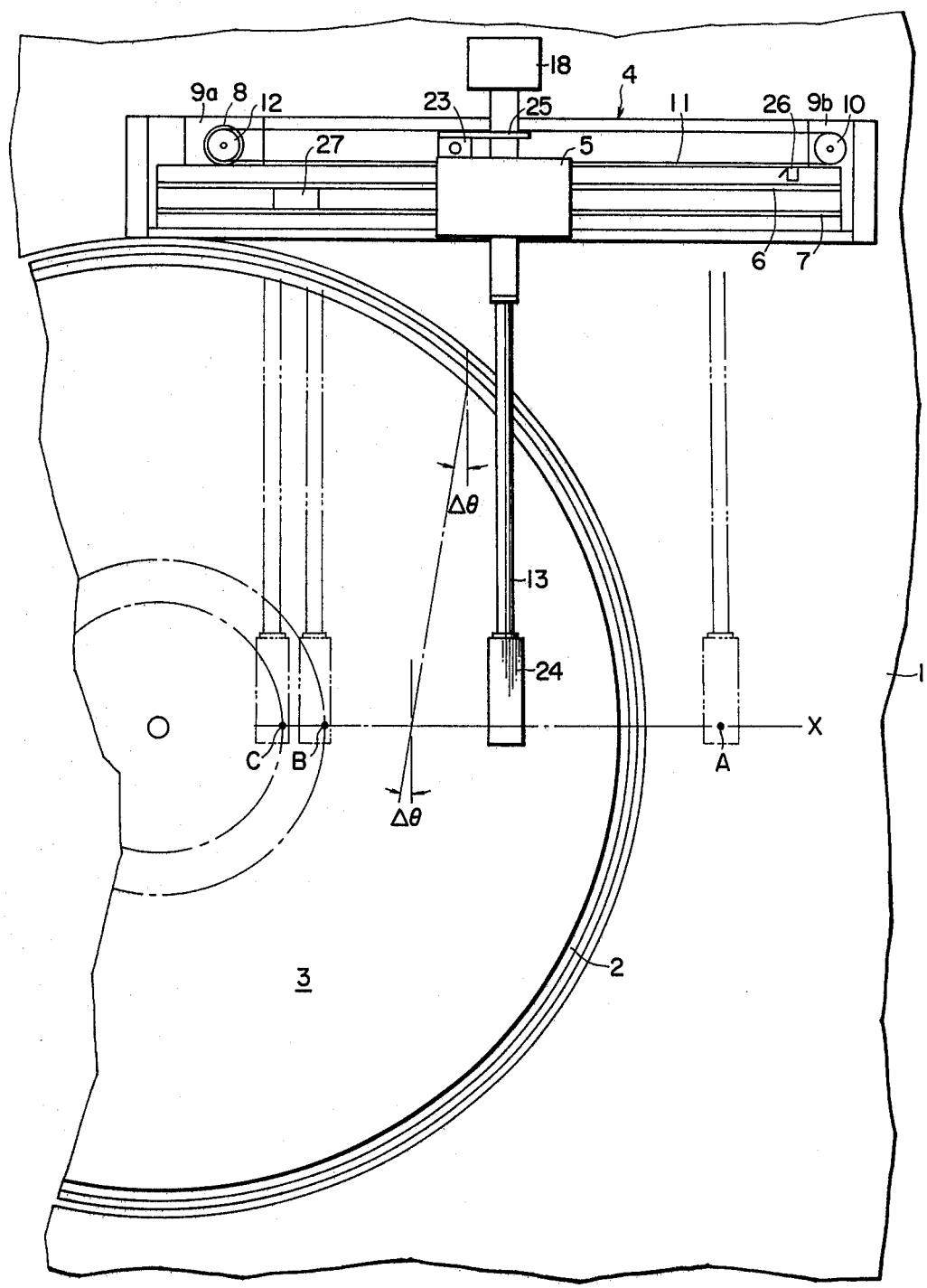
FIG. 1 is a plan view of a linear tracking pickup apparatus equipped with a device for detecting an offset angle of the pickup arm embodying the present invention, excluding its electrical circuitry.

Referring now to FIG. 1 through FIG. 8 description will hereunder be made mainly on the mechanism of the device for detecting an offset angle of the pickup arm.

On one side of a base plate 1 is mounted a platter or turntable 2 which carries, for example, a phonographic disc 3 thereon and which is adapted to be turned at a constant speed. On that side of the base plate 1 is provided a fixed guide structure 4 in parallel relation with the radial direction of the surface of the disc 3.

A movable carriage 5 is supported on the first and the second guide rails 6 and 7 by means of rollers 28a and 28b. The movable carriage 5 is guided by these first and second guide rails 6 and 7 for free linear movement radially of the disc 3.

A pickup arm drive motor 8 is attached to one 9a of the supporting lugs of the fixed guide structure 4. The motor 8 is designed so that its rotation speed and direction of rotation are determined by the value and the polarity of the voltage applied. A pulley 10 is rotatably attached to the other one 9b of the supporting lugs of the guide structure 4. Both ends of a belt 11 which is applied between this pulley 10 and a pulley 12 secured to the rotary shaft of the drive motor 8 are coupled to the movable carriage 5. This movable carriage 5 is caused to move linearly along a radius of the disc 3 along the first and the second guide rails 6 and 7 in accordance with the forward or reverse rotation of the drive motor 8.

Figure 2:
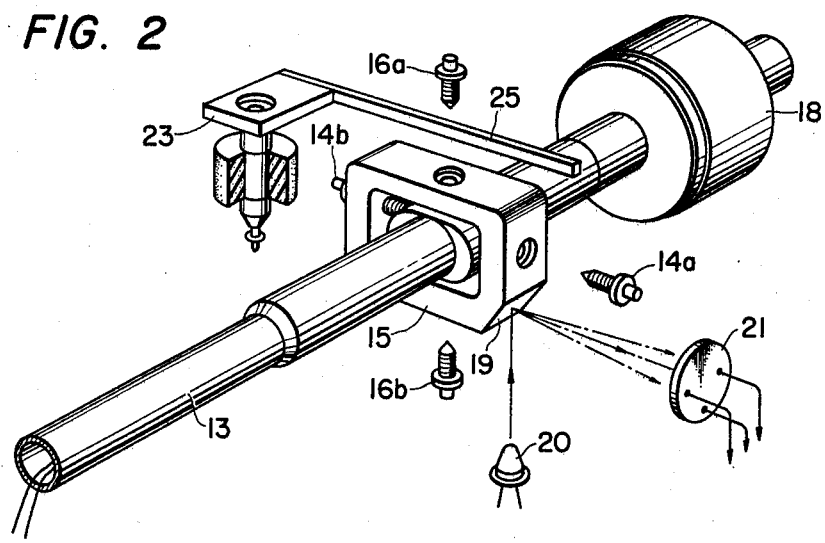
FIG. 2 is a perspective explanatory illustration of the device shown in FIG. 1, to explain the positional relationship of the essential parts of the device.
Figure 3:
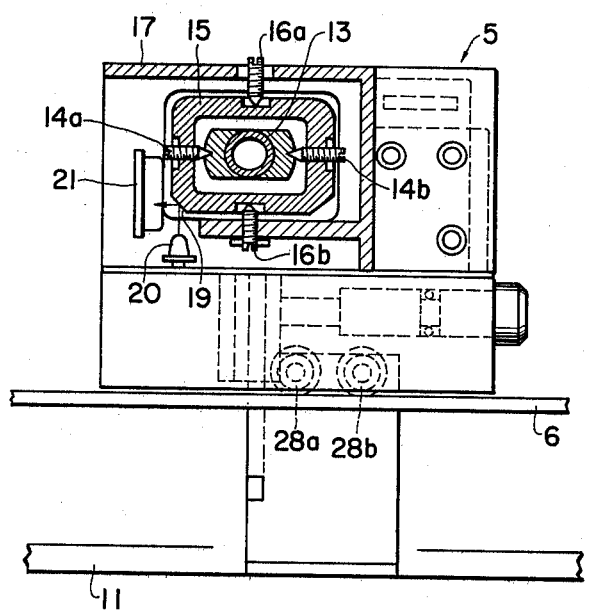
FIG. 3 is a front view, partially in section, showing briefly a gimbal support mechanism of the pickup arm moving system.

On the movable carriage 5 is supported a pickup arm 13 at its base portion by a known gimbal support mechanism so as to be freely swingable and pivotable both vertically and horizontally as will be noted in FIGS. 2 and 3. In further detail, the pickup arm 13 is supported by two pivot bearings 14a and 14b on an inner first frame 15 so as to be vertically pivotable relative to this inner frame 15 which constitutes a part of the gimbal support mechanism. This inner first frame 15 of the gimbal support mechanism is supported by other two pivot bearings 16a and 16b on an outer second frame 17 which constitutes a part of the movable carriage 5 and also a part of the gimbal support mechanism, so as to be horizontally swingable in accordance with the horizontal swinging movements of the pickup arm 13 relative to an outer second frame 17 which is not swingable but is capable of making only linear movement as shown in FIG. 3. At an end portion of the pickup arm 13 is mounted a balance weight 18 for adjusting the pressure applied to a stylus not shown which is provided on a pickup head 24 provided at the foremost end of the pickup arm 13. A reflecting surface 19 is formed by making a portion (a corner portion in the illustrated example) of the surface of the inner first frame 15 in the form of a mirror surface. Alternatively, a separate mirror body may be provided on a portion of the surface of the inner first frame 15 in such a manner that the balance of this frame 15 is not deranged by the attachment of this mirror body. A light-emitting element 20, such as a light-emitting diode, is arranged on a fixed member, for example, the outer second frame 17 as shown in FIG. 3 in such a manner that the light rays of this diode 20 impinge onto said mirror surface 19. A photo-electric sensor 21, such as a photo-transistor, is arranged on the carriage 5 so as to receive the light rays reflected by the light-reflecting surface 19.

An electrically actuatable arm lifter 23 is attached to the rear side of the movable cartridge 5 to lift upwardly the foremost end, i.e. the pickup head 24, of the pickup arm 13. This arm lifter 23 is of any known type and comprises a plunger and an electromagnetic solenoid for actuating this plunger. A viscous fluid may be enclosed within the lifter for braking the upward as well as the downward movements of the plunger. And, the tip of a pressing plate 25 is secured to the plunger of the arm lifter 23 is positioned above the end portion of the pickup arm 13 so as to face the latter. When the pickup arm 13 is in its uplifted position due to the action of the arm lifter 23, this pickup arm 13 is regulated of its horizontal position so as to cross, at right angle, the first as well as the second guide rails 6 and 7 by a direction-regulating member not shown.

A micro-switch 26 and a reed switch 27 are provided on the guide rails for detecting the fact that the pickup arm 13 is in a specific position.

The micro-switch 26 makes and breaks depending on the contact and release of its actuator with and from the movable carriage 5, thereby detecting whether the pickup arm 13 is located in the position of the arm rest not shown or it is located in other positions. The reed switch 27 makes and breaks depending on the polarity of the magnetic field of a permanent magnet not shown which is provided in the foreground of the movable carriage 5, thereby detecting whether the pickup arm 13 is located within the space range between the position B and the position C, as are indicated by dot-and-dash lines in FIG. 1. The position B is at the distance of 106.4 mm/2 from the spindle of the platter 2, i.e. from the center of the disc 3. This distance corresponds to the distance between the center of the disc of 30 cm (about 12 inches) in diameter and the extreme end of the signal-carrying groove of the disc. The position C is at the distance of 97 mm/2 from the spindle of the platter 2, and this distance is equivalent to the distance between the center of the disc of 17 cm (about 7 inches) in diameter and the extreme end of the lead-out groove.

Figure 4:
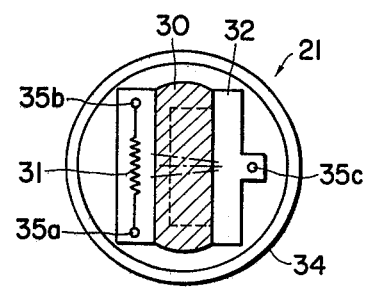
FIGS. 4–6 are somewhat diagrammatic representations for explaining, in a greater detail, a photo-electric sensor employed in the mechanism of FIG. 2.
Figure 5:
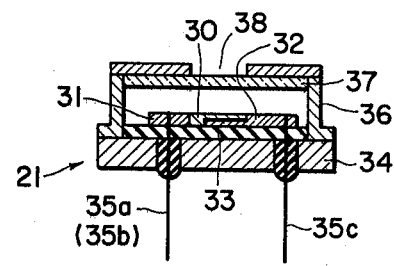
Figure 6:
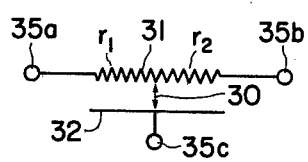

The photo-electric sensor 21 has a structure shown in FIGS. 4, 5 and 6. On the upper face of an insulating wafer 33 which is enclosed within a metal casing 34 are formed a conductive electrode 32 and a thin film-like resistor 31 so as to be positioned close to each other in a spaced relationship. Between this electrode 32 and the thin resistor 31 is stuffed a photo-conductive material 30 such as selenium CdSe or cadmium sulfide CdS. On the upper face of the metal casing 34 is placed a photo-mask having a slit 38 therethrough centrally thereof which is covered, on one surface, by a transparent glass plate 37 which provides a hermetic seal 36 of the casing 34. This slit 38 is positioned so as to face the photo-conductive element 30. Lead wires 35a and 35b from the opposite ends of the thin resistor 31 and the lead wire 35c of the electrode 32 extend to the outside of the metal casing 34 in such a known manner that the state of their insulation from this metal casing 34 can be established.

The aforesaid photo-electric sensor 21 is such that, whenever a beam of light impinges onto this photo-electric sensor 21 after passing through the slit 38, the electric resistance of that portion of the photo-conductive element 30 to which the beam of light impinges will have a very low value. Owing to this low resistance value, there substantially takes place a short circuiting between the thin resistor 31 and the conductive electrode 32 at the position where the beam of light has impinged to the photo-conductive element. In other words, this photo-electric sensor 21 may be regarded as a sort of potentiometer whose slider tap moves in correspondence with the position of incidence light beam. Thus, this photo-electric sensor 21 may be expressed by the equivalent electrical circuit shown in FIG. 6.

Figure 7:
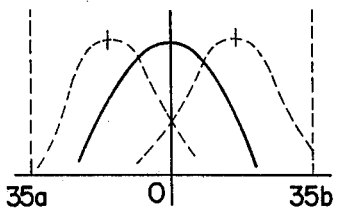
FIGS. 7 and 8 are diagrams for explaining the functions of the photo-electric sensor.
Figure 8:
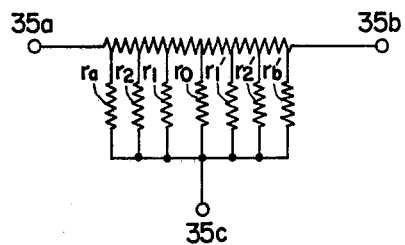

The photo-electric sensor 21 is arranged so that, depending on the position in the surface area of the photo-conductive element 30 to which position the light rays from the light-emitting diode 20 impinge, the resistance value of this photo-electric sensor 21 will vary. When the photo-conductive element 30 which is provided at the region shown by the arrows between the electrode 32 and the resistor 31 becomes to have a low resistance, the resistor 31 and the electrode 32 are substantially short-circuited at this region. Thus, the position of the light rays impinging onto the photo-conductive element 30 can be externally derived in the form of a signal at a ratio of $r_1/r_2$ between the lead wires 35a, 35b and 35c. Since the photo-electric sensor 21 has the function described above, it would be a common sense to form the light rays as a small and sharp spot and to project such a spot light onto the area between the lead wires 35a, 35b and 35c. However, since the reflecting surface 19 is formed on the surface, as a part thereof, of the inner first frame 15 which constitutes a part of the gimbal support mechanism as stated previously, it is technically difficult to form such a small and sharp spot of light rays. Besides, such a spot light is liable to being affected by the invading external ambient light rays (leakage of the exterior light rays). Accordingly, in the present invention, there is employed a broad flux of light rays which has a most intensively illuminating portion in the central area of the flux of light rays which becomes less intensive closer to the periphery of the flux of light rays as shown in FIG. 7. An angular change of the reflected light beam or flux of light rays from the reflecting surface 19 is derived as an amount of displacement of the center of this broad light beam. Therefore, an output of the photo-electric sensor 21 as shown in FIG. 7 is obtained. In FIG. 7, the interval between the vertical broken lines 35a and 35b corresponds to the interval between the lead wires 35a and 35b, and the symbol O indicates the center between these two lead wires 35a and 35b. FIG. 8 shows an equivalent circuit diagram of the photo-electric sensor 21 where the output characteristic of the photo-electric sensor 21 is that indicated by a solid line in FIG. 7. In FIG. 8 are shown the resistance variations at each position in the resistor 31 as being $r_0 < r_1 < r_2 < r_a$ and $r_0 < r_{1'}, < r_{2'}, < r_{b'}$. Thus, the value of the resistance $r_0$ of the above-mentioned equivalent circuit will vary in accordance with the lateral swinging displacement of the center of the light beam, as shown by the two pyramid-like broken lines in FIG. 7.

Figure 9:
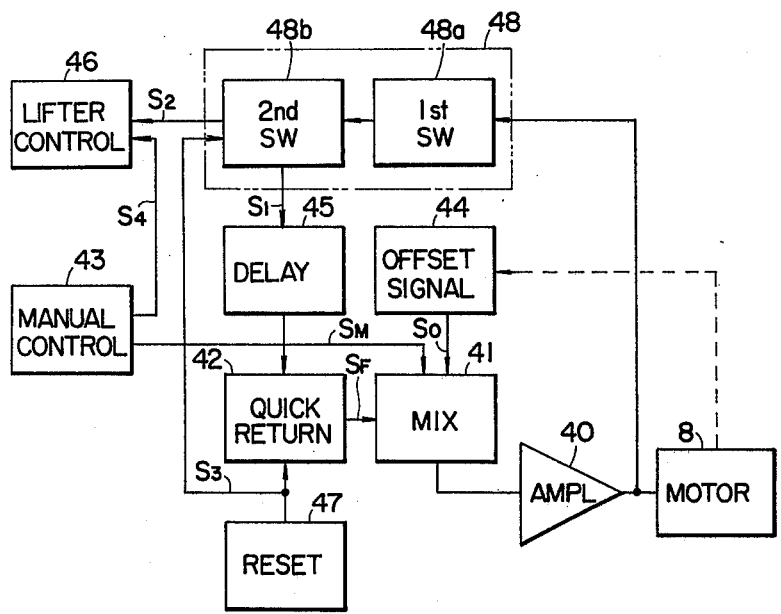
FIG. 9 is a block diagram showing an example of the electrical circuitry employed in the pickup arm driving mechanism in the present invention.

FIG. 9 shows an example of the electrical circuit of the pickup arm driving device equipped with the device of the present invention. This electrical circuit is comprised of: a servo amplifier 40; a mixing circuit 41; a quick return signal generating circuit 42; a manual control signal generating circuit 43; an offset signal generating circuit 44; a delay circuit 45; a lifter control circuit 46; a rest circuit 47; and a signal groove end detecting circuit 48.

Figure 10:
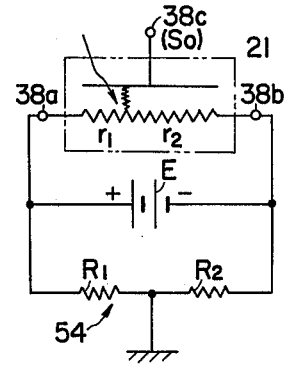
FIG. 10 is a circuit diagram showing an example of the offset angle signal generating circuit.

The offset signal generating circuit 44 generates an offset signal $S_0$ having a value and a polarity corresponding to the magnitude and the direction of the offset angle $\Delta\phi$ of the pickup arm 13 which are detected by the offset angle detector of the present invention. This offset signal generating circuit 44 is comprised of, for example, a bridge circuit, as shown in FIG. 10, which is formed with the above-mentioned photo-electric sensor 21 and resistors $R_1$ and $R_2$. In case the pickup arm 13 crosses at right angle the first and the second guide rails 6 and 7 so that the offset angle of the pickup arm 13 is kept zero, a central part of the broad light beam from the light-emitting diode 20 impinges onto the central portion of the photo-conductive element 30. Thus, the resistance value of the resistance $r_1$ becomes equal to the resistance value of the resistor $r_2$. Accordingly, the bridge circuit is rendered to its balanced state. As a result, the voltage of the direct current source E does not appear at the lead 35c of the photo-electric sensor 21, i.e. at the output terminal of the offset signal generating circuit 44. It is, however, assumed that the resistance value of the resistor $R_1$ is equal to the resistance value of the resistor $R_2$. On the other hand, as the pickup arm 13 swings toward the center of the disc 3, developing an offset angle $\Delta\phi$ in the forward direction, the central part of the broad light beam will impinge onto that portion of the photo-conductive element 30 of the photo-electric sensor 21 which is located closer to the lead 35a, thereby decreasing the resistance value of the resistor $r_1$. The resistance value of the resistor $r_2$ will increase for the amount of decrease in the resistance value of the resistor $r_1$. As a result, the balanced state of the bridge circuit becomes destroyed. Thus, a positive direct current voltage which is proportional to the magnitude of the offset angle $\Delta\phi$ will appear at the lead 35c of the photo-electric sensor 21.

The signal groove end detecting circuit 48 is comprised of: a first switching circuit 48a is adapted to be rendered conductive whenever the output of the servo amplifier circuit 40 exceeds its preset level with sharp increase in magnitude of the offset signal $S_0$; and a second switching circuit 48b which is adapted to be rendered conductive by the closure of the reed switch 27 when the pickup arm 13 is located within the range of positions between position B inclusive and position C inclusive, i.e. when the pickup arm 13 is located at a position closer to the center of the disc 3 than the position corresponding to the end of the signal-carrying groove of the disc of 30 cm in diameter. When the two switching circuits 48a and 48b are rendered conductive, there are generated signal groove end detection signals $S_1$ and $S_2$.

The quick return signal generating circuit 42 will, upon its receipt of the signal groove end detection signal $S_1$, continue to generate a quick return signal SF until a reset signal $S_3$ is generated from the reset circuit 47. This quick return signal SF is a direct current voltage of negative polarity having a value which is necessary for rotating the motor 8 in reverse direction at a high speed.

The reset circuit 47 generates a reset signal $S_3$ only during the period of time in which a micro-switch 26 is closed. Upon generation of this reset signal $S_3$, both the quick return signal generating circuit 42 and the signal groove end detecting circuit 48 are reset, and the delivery of the quick return signal SF and the signal groove end detection signals $S_1$ and $S_2$ ceases.

The manual control signal generating circuit 43 is actuated only when the pickup arm 13 is fed under manual control. This circuit 43 generates a manual control feed signal SM which is adapted to be adjustable of its own polarity and value, and a lifter control signal $S_4$.

Description will hereunder be directed to the operation of the pickup arm driving device explained above.

Let us now assume that the pickup arm 13 is placed on the arm rest not shown at position A in FIG. 1. When, in such a state of the pickup arm 13, the manual control signal generating circuit 43 is actuated to generate a lifter control signal $S_4$ and a forward-oriented manual control feed signal SM, the lifter control circuit 46 energizes the arm lifter 23 so that the pickup arm 13 is swung upwardly and the motor 8 is caused to make forward rotation. As a result, the movable carriage 5 is caused to move toward the center of the disc 3. At such a time, the pickup arm 13 is held, by the aforesaid swinging movement regulating member, in a position which is at right angle relative to the first and the second guide rails 6 and 7. As such, the offset signal $S_0$ is nil. Thus, when the pickup arm 13 has arrived at a required position above the disc 3, say above the lead-in groove of the disc 3, the user stops the actuation of the manual control signal generating circuit 43. Whereupon, the arm lifter 23 is de-energized. Along with this, the plunger of the arm lifter 23 starts its gentle upward movement while being subjected to the braking action of the viscous fluid, if any, contained within the arm lifter. As a result, the foremost end of the pickup arm 13 is gently lowered onto the surface of the disc 3, and the reproduction of the signal carried on the disc 3 is started.

Thereafter, by the feedback system of: offset angle detector - offset signal generating circuit 44 - servo amplifier 40 - motor 8, the pickup arm 13 is automatically fed toward the center of the disc 3 progressively in accordance with the rotation of this disc, while its offset angle $\Delta\phi$ maintained at substantially zero value. More specifically, when the pickup arm 13 swings for a very trivial amount of angle toward the center of the disc 3 and develops an offset angle $\Delta\phi$ in the forward direction, this offset angle is detected by the offset angle detector, and an offset signal $S_0$ of the positive polarity is generated from the offset signal generating circuit 44. By this offset signal $S_0$, the motor 8 is caused to make forward rotation. Whereupon, the movable carriage 5 is caused to move for a trifle distance toward the center of the disc 3 in such a manner that the offset angle developed by the pickup arm 13 is corrected back to substantially zero value.

Thus, if the disc 3 is 30 cm in diameter, the pickup arm 13 will, when it arrives at position B, i.e. at the end of the signal carrying groove of the disc 3, tend to move rapidly toward the center of the disc 3 while being guided by that lead-out groove of the disc 3 having a suddenly broadened pitch which entails the end of the signal-carrying groove, causing a sudden increase in the offset angle of the pickup arm 13, whereby the offset signal generating circuit 44 will generate an offset signal $S_0$ of the positive polarity and of a large value. As a result, the output level of the servo amplifier 40 exceeds the pre-set value, and thereby the first switching circuit 48a of the signal groove end detecting circuit 48 is rendered conductive. Since, at such a time, the permanent magnet of the movable carriage 5 is in the position of facing the reed switch 27, this latter switch 27 is closed by the magnetic field of this permanent magnet, whereby the second switching circuit 48b of the signal groove end detecting circuit 48 is also rendered conductive. Accordingly, groove end detection signals $S_1$ and $S_2$ are generated from the signal groove end detecting circuit 48.

The lifter control circuit 46, upon its receipt of the groove end detection signal $S_2$, is actuated to energize the arm lifter 23. Thus, this arm lifter 23 causes the pickup arm 13 to make an upward swinging movement about its fulcrum. After the groove end detection signal $S_1$ has been delayed, by the delay circuit 45, until the pickup arm 13 has completed a sufficient upward swinging movement, the signal $S_1$ is inputted to the quick return signal generating circuit 42. Whereupon this circuit 42 generates a quick return signal SF. This signal SF is amplified by the servo amplifier 40 and the amplified signal is applied to the motor 8. Thereby, the motor 8 is caused to make a reverse rotation at a high speed, so that the movable carriage 5 is caused to move toward the arm rest at a high speed. Throughout the period of movement of the movable carriage 5, the groove end detection signal $S_2$ is continuously delivered from the signal groove end detecting circuit 48 to the lifter control circuit 46, thus continuing the energization of the arm lifter 23. Accordingly, the pickup arm 13 is kept in its uplifted position. And, the pickup arm 13 moves, together with the movable carriage 5, while being held at right angle relative to both the first and the second guide rails 6 and 7 by the angle regulating member not shown. As such, during this period of movement, the offset signal $S_0$ is nil. When the pickup arm 13 reaches position A, the movable carriage 5 is brought into contact with the actuator of the micro-switch 26, causing this micro-switch to close. Thereby, a reset signal $S_3$ is generated from the reset circuit 47, causing both the quick return signal groove end detecting circuit 48 to be re-set. Thus, the delivery of the quick return signal SF and of the groove end detection signal $S_2$ cease, and the movable carriage 5 comes to a halt. Along with this, the arm lifter 23 is de-energized, and the pickup arm 13 is lowered on the arm rest not shown. With this, the automatic quick return operation of the pickup arm 13 completes.

As set forth above, this invention consists in a device for detecting the tracking angle of an arm of the gimbal support type, characterized in that a reflecting surface is formed at a part of the surface of an inner first frame constituting a gimbal support mechanism, that the light rays from a light-emitting source located at a fixed position is reflected towards a light receptor by said reflecting surface, and that the offset angle of the arm is detected in the form of an output of the light receptor which output changes in response to a change in the position of the light receptor illuminated by the central portion of the reflected light. Therefore, an offset angle detection of a very high sensitivity is possible without sacrificing the lateral balance of the pickup arm. Another advantage of the device of the present invention is that its structure is simple. Still another advantage is that, since the broad light beam is utilized and since the light receptor is illuminated in its entire light-receiving area by the ambient light rays, erroneous operations ascribable to the leakage of light from the exterior which have been the problem in the prior art can be minimized.

It is a matter of course that the detecting device of this invention is not restricted to the linear tracking arm system exemplified in the above embodiment, but that it is also applicable to players of the conventional rotary arm system.

I claim:

1. A pickup arm driving device in a linear tracking pickup apparatus, comprising:
    a pickup arm for tracing on a disc;
    support means for said pickup arm including a movable gimbal support including first means for supporting the pickup arm for vertical movement and second means for supporting the pickup arm for horizontal movement, said second means having a surface serving as a light-reflecting surface, and means mounting said gimbal support for linear movement;
    a motor designed so that its rotation speed and direction of rotation are determined by the value and the polarity of the voltage applied;
    a motive power transmitting means for converting the rotation force of said motor to a linear movement force and transmitting the latter force to said movable gimbal support;
    an offset angle detector for detecting a horizontal offset angle of the pickup arm, comprising said light-reflecting surface, a light-emitting source fixed to said mounting means to face said light-reflecting surface, and a photo-sensitive element fixed to said mounting means to face said light-reflecting surface;
    an offset signal generating circuit connected to said offset angle detector for generating an offset signal having a variable value and polarity corresponding to the variable magnitude and direction of the offset angle detected; and
    an amplifier for receiving, as an input thereof, said offset signal and for driving said motor, by the output of this amplifier, to rotate in a direction corresponding to the direction of movement of said movable gimbal support in which the offset angle decreases.

2. A pickup arm driving device according to claim 1, in which:
    said offset signal generating circuit comprises an electrode provided in contact with one side of said photo-sensitive element, a resistance body provided in contact with the other side of said photo-sensitive element, lead wires connected to both ends of said resistance body, and another lead wire connected to said electrode, whereby said output of said offset signal generating circuit is derived as a ratio of a resistance between one of the lead wires of said resistance body and the illuminated position of said photo-sensitive element to a resistance between the other lead wire of said resistance body and said illuminated position.

3. A pickup arm driving device according to claim 1, in which:
    the light rays from the light-emitting source are reflected at said light-reflecting surface as a broad light beam, and a change in the offset angle is derived as the amount of displacement of the center of this broad light beam.

4. A pickup arm driving device in a linear tracking pickup apparatus comprising:
    a pickup arm for tracking on a disc;
    support means for said pickup arm including a movable gimbal support with an inner first frame for supporting the pickup arm for vertical as well as horizontal movements and permitting the pickup arm to make linear travel radially of a disc in a horizontal direction and an outer second frame mounting said first frame and pickup arm for horizontal movement, and means for mounting said gimbal support for linear movement;
    a motor designed so that its rotation speed and direction of rotation are determined by the value and the polarity of the voltage applied;
    a motive power transmitting means for converting the rotation force of said motor to a linear movement force and transmitting the latter force to said movable gimbal support;
    an offset angle detector for detecting a horizontal offset angle for the pickup arm, including a light-reflecting surface formed on the surface of a portion of said inner first frame of said movable gimbal support to constitute a part of the surface thereof, a light-emitting source fixed to said outer second frame to face said light-reflecting surface and a photo-sensitive element fixed to the outer second frame to face said light-reflecting surface;

an offset signal generating circuit connected to said offset angle detector for generating an offset signal having a variable value and polarity corresponding to the variable magnitude and direction of the offset angle detected; and an amplifier for receiving, as an input thereof, said offset signal and for driving said motor, by the output of said amplifier, to rotate in a direction corresponding to the direction of movement of said movable gimbal support in which the offset angle decreases.

5. A pickup arm driving device according to claim 4, in which:

said light-emitting source is a light-emitting diode mounted on said outer second frame.

* * * * *